July 10, 1951 G. W. JOHNSON 2,560,524
POULTRY PICKING MACHINE
Filed June 17, 1946 4 Sheets-Sheet 1
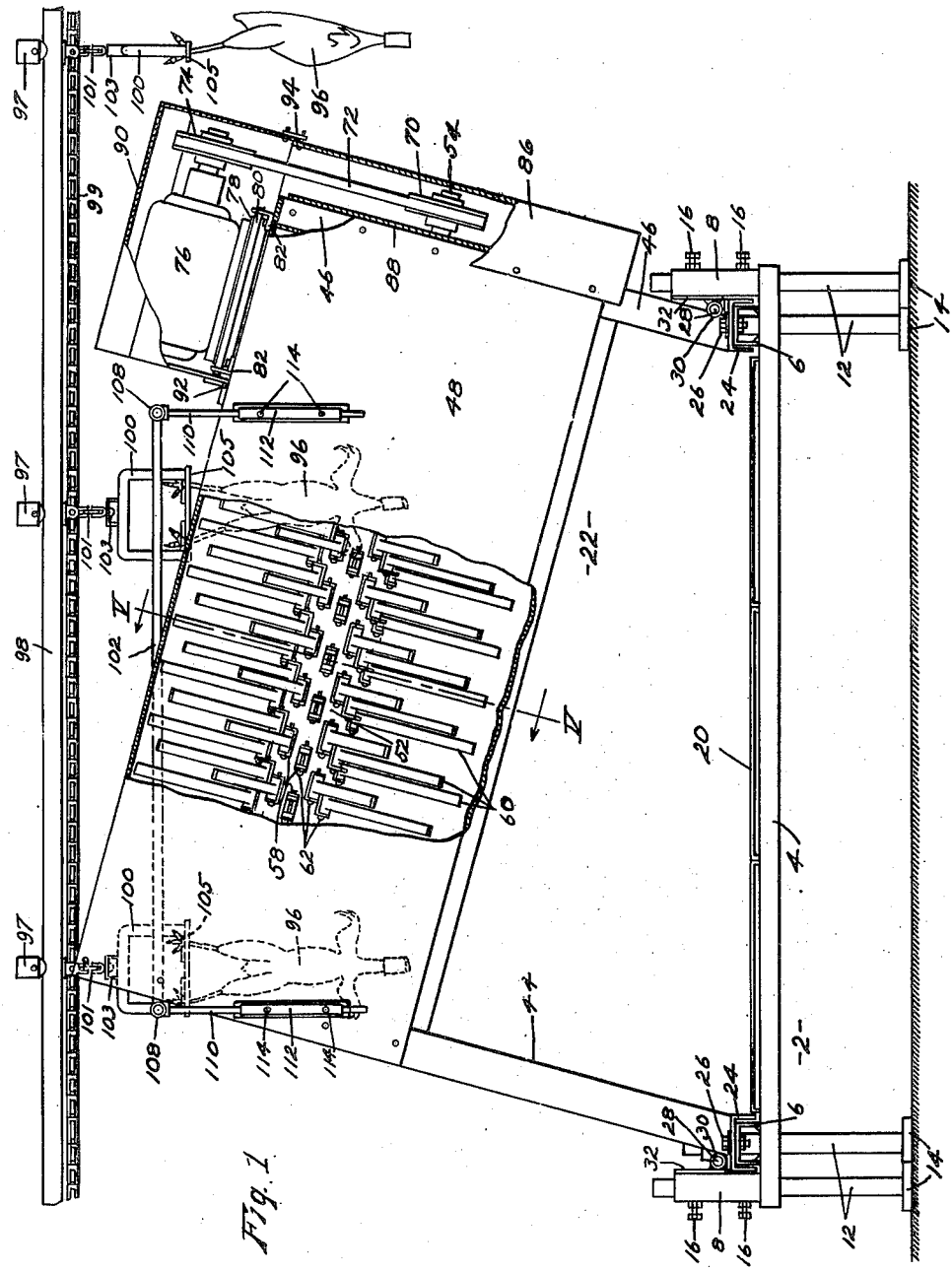
INVENTOR,
Gordon W. Johnson.
BY
Roy E. Hamilton,
Attorney.

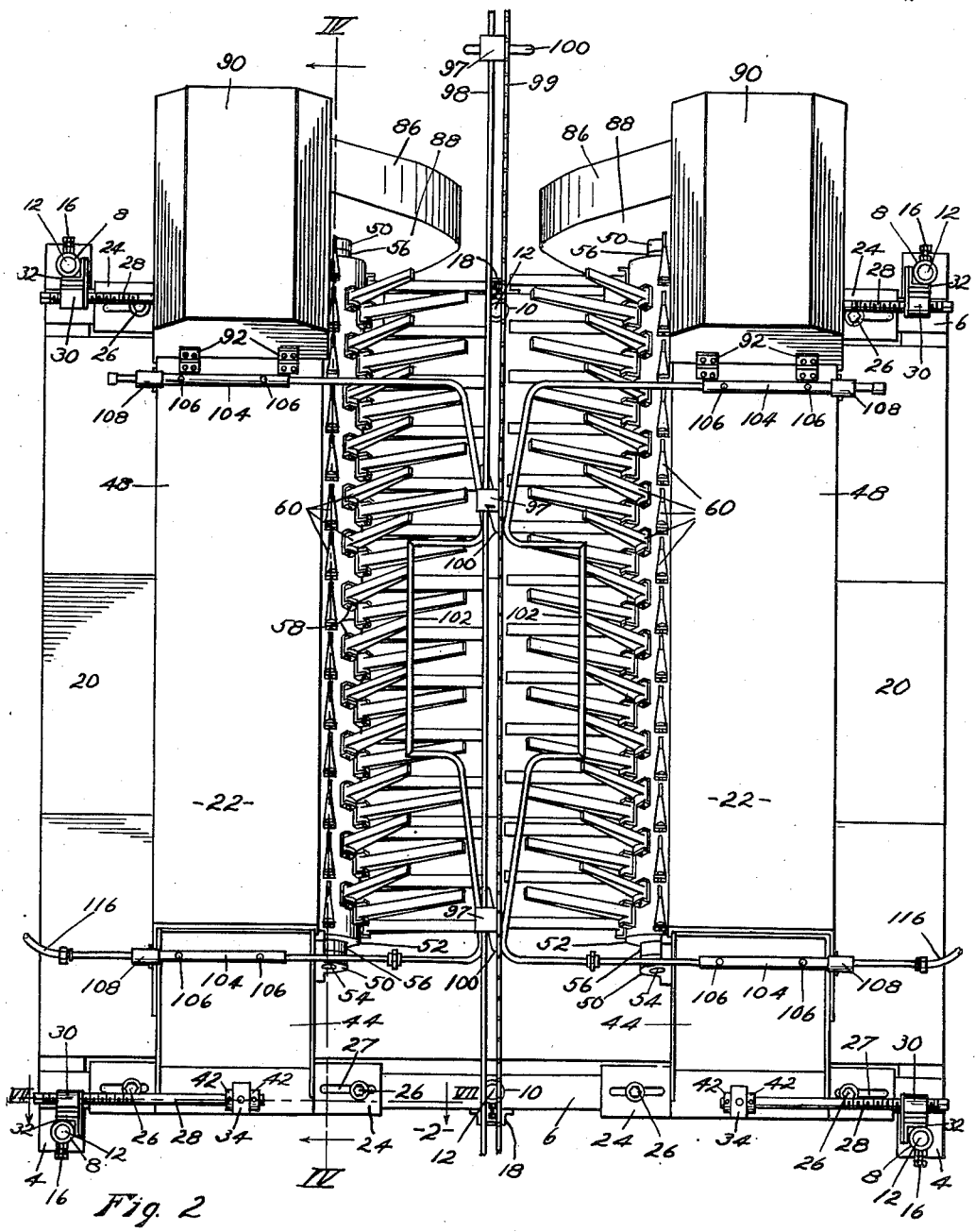

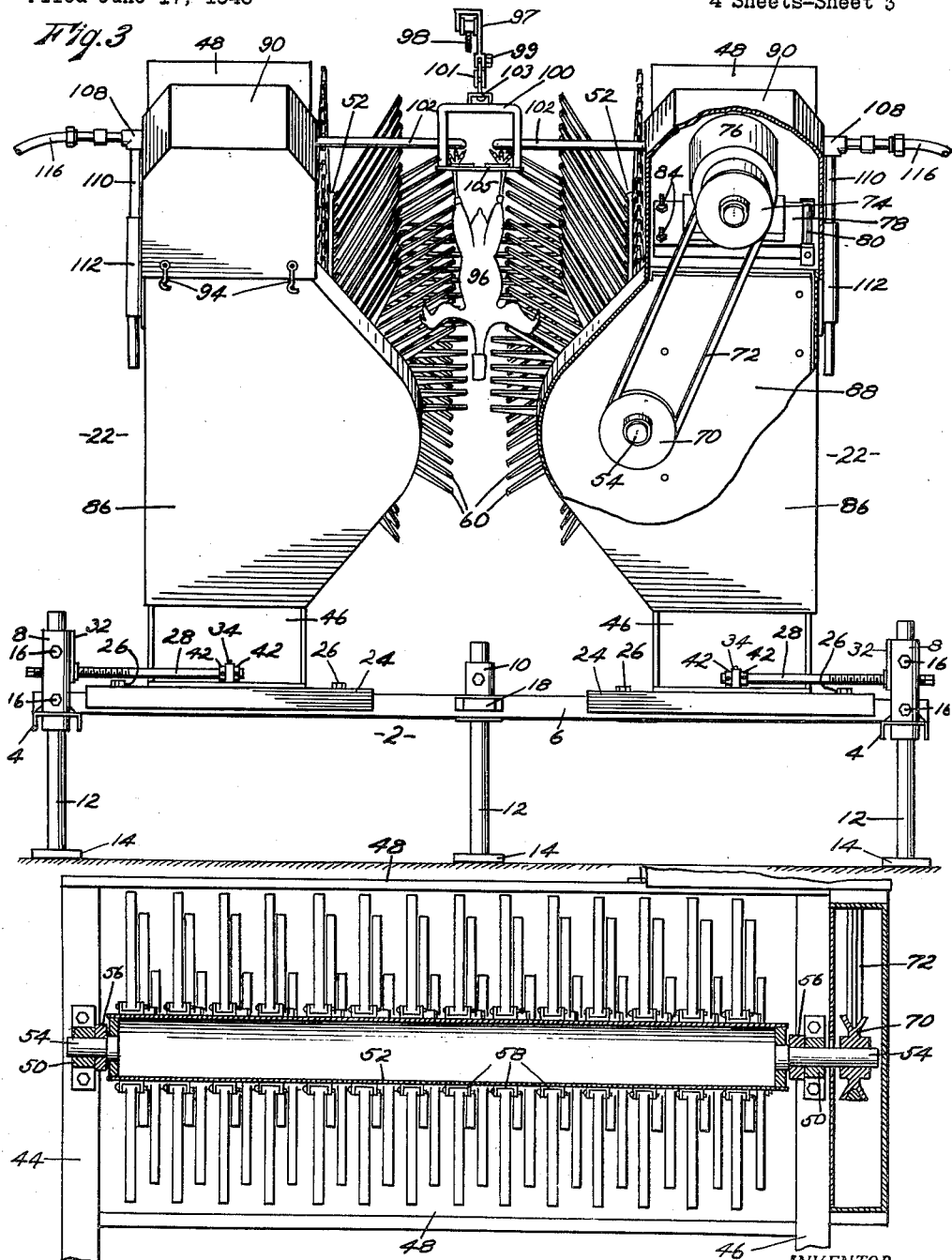

July 10, 1951  G. W. JOHNSON  2,560,524
POULTRY PICKING MACHINE
Filed June 17, 1946  4 Sheets-Sheet 4
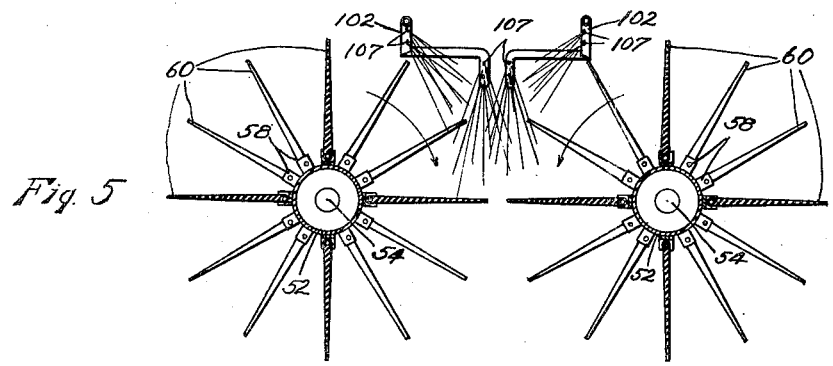
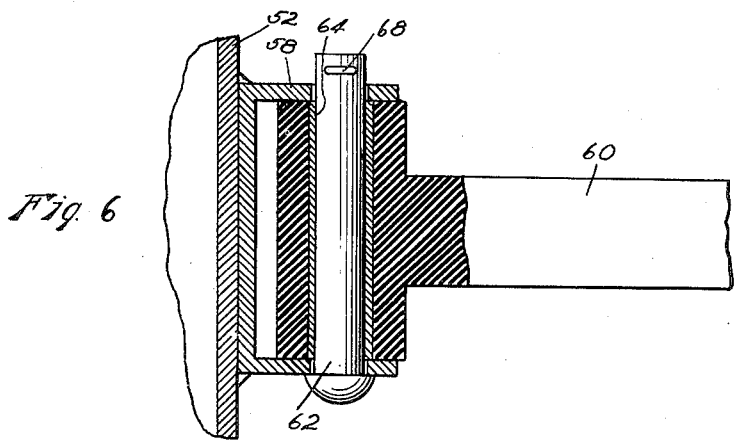
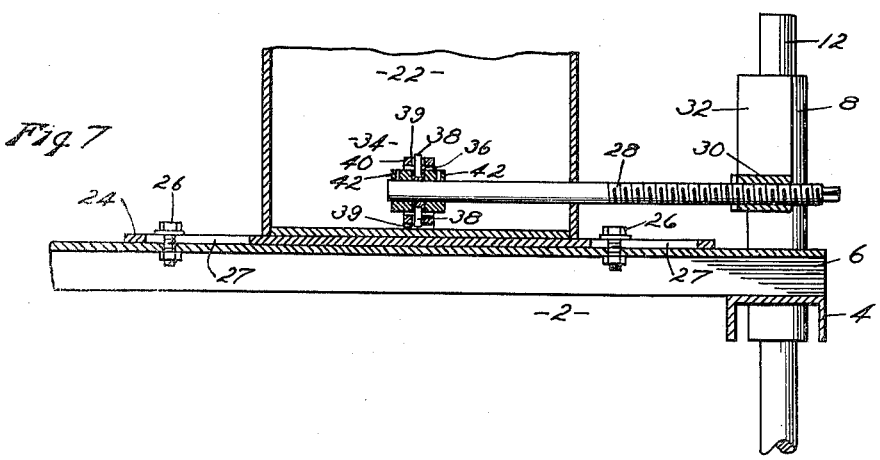
INVENTOR,
Gordon W. Johnson.
BY
Roy E. Hamilton,
Attorney.

Patented July 10, 1951

2,560,524

UNITED STATES PATENT OFFICE 2,560,524

POULTRY PICKING MACHINE

Gordon W. Johnson, Raytown, Mo., assignor to Gordon Johnson Company, Kansas City, Mo., a corporation of Missouri Application June 17, 1946, Serial No. 677,130

6 Claims. (Cl. 17—11.1)

This invention relates to improvements in a machine for mechanically removing the feathers from chickens, turkeys, and other poultry, and has as its principal object the provision of an apparatus which will perform this operation on a fowl as it is carried through the apparatus on a suitable conveyor in a straight line. This is a distinct improvement over machines requiring the vertical or horizontal movement of the fowl or of the picking means.

Further objects of this invention are the provision of an automatic means for repeatedly positioning the fowl in such a manner that all parts of the bird are presented to the action of the picking fingers, thereby procuring a thorough removal of feathers from all parts of the fowl body, the provision of a simple and efficient means of adjusting the machine to accommodate the various sizes of fowl to be picked, and the provision of a simple means for adjusting the machine to the height of the conveyor line.

These and other objects of this invention will appear in the accompanying specification and drawings, in which:

Figure 1 is a side elevation of a machine embodying the present invention, with a portion of the side panel broken away to show part of one of the rotating drums with its picking fingers, and with a portion of the motor cover and belt guard broken away to show the motor and drum driving system.

Fig. 2 is a plan view of the entire machine.

Fig. 3 is a rear elevation of the machine with a portion of the motor cover and belt guard broken away.

Fig. 4 is a fragmentary section taken on line IV—IV of Figure 2, showing the drum construction and bearings.

Fig. 5 is a fragmentary section taken on line V—V of Figure 1.

Fig. 6 is a sectional view showing the method of mounting the resilient fingers on the drums.

Fig. 7 is an enlarged fragmentary section taken on line VII—VII of Figure 2, showing the means of adjusting the distance between the rotating drums.

In all views the resilient picking fingers are shown extended at right angles to the surface of the drum, this being the position they assume when the drums are rotating. When the machine is at rest the fingers, being pivoted to the drum, will rest against the surface of said drum. Like numerals refer to similar parts through the several views.

The base 2 of the machine comprises the main support members 4, extending from front to rear of the machine, cross support members 6 extending between and rigidly attached to said main support members at a position adjacent their extremities, outer leg sleeves 8 rigidly attached perpendicularly to the ends of said main support members, and center leg sleeves 10 rigidly attached perpendicularly to the central portions of said cross support members. Legs 12 telescope with said inner and outer leg sleeves and are rigidly attached to pedestals 14. Said sleeves may be rigidly fixed on said legs by means of set screws 16. Vertical movement of said machine base on said legs is accomplished by placing an automobile type jack, not shown, under jack lugs 18, firmly fixed to cross support members 6, adjacent to the inner legs. With said jacks in position, set screws 16 may be loosened, the jacks operated to raise or lower the machine base, set screws 16 tightened, and the jacks removed.

A removable feather tray 20 for receiving feathers as they fall from the picking drums above, rests across main support members 4.

The drum supporting frames 22 are rigidly attached to drum frame support channels 24, said support channels being carried by and adjustably movable along cross support members 6. Said adjustment may be fixed by tightening clamp bolts 26, which pass through elongated slots 27 in said drum frame support channels, and through said cross support members, as shown in Figure 7. Said adjustment is accomplished by means of adjustment screws 28, said screws being threaded in nuts 30 rigidly attached to angle irons 32, which are in turn firmly fixed to outer leg sleeves 8. The opposite ends of said screws pass through and are adapted to rotate in a pivoted bearing 34 rigidly attached to drum frame 22 and detailed in Figure 7. The shaft of screw 28 passes through and rotates in bearing collar 36, which is pivotally mounted about a vertical axis by means of pins 38 rigidly attached to said bearing collar and loosely fitted in holes 39 in bearing housing 40 which is firmly fixed to drum frame 22. Longitudinal movement of said screw shaft through said bearing collar is prevented by set collars 42, rigidly attached to said screw shaft adjacent each side of said bearing collar. The pivoting of this bearing is necessary to prevent binding when it is desired to position the drum frames, and the hereinafter described drums carried by said frames, in a non-parallel relationship, that is, at an angle to the longitudinal axis of the machine. Also, for this purpose, it is necessary that drum frame support channels 24 fit over cross support members 6 very loosely, as shown in Figure 1. This looseness will allow for a slight misalignment between the center lines of said drum frame support channels and cross support members when the opposite ends of a drum frame are placed at different distances from the longitudinal center line of the machine. The outer ends of screw shafts 28 are squared to receive a removable manually operable crank, not shown.

Each drum frame 22 comprises an upper end panel 44, a lower end panel 46, and a housing member 48 firmly fixed to said end panels. Said end panels are rigidly fixed to drum frame support channels 24, and have their edges flanged outwardly from the center of the machine. Firmly fixed to said flanges adjacent the center of the machine are bearings 50, so positioned as to rotatably mount a substantially cylindrical drum 52, carried by axles 54.

Mounted on the periphery of each of said drums are a plurality of finger mounting brackets 58, each of said brackets mounting a finger 60 of rubber or some other resilient material by means of a pin 62, said pin being parallel to the axis of said drum and retained in said bracket by means of cotter pin 68. Tightly fitting in the hole through finger 60 through which pin 62 passes is a bearing sleeve 64, which turns freely on pin 62 and prevents wear on the rubber of said fingers. A detail of the finger mounting is shown in Figure 6.

On the extended end of the axle 54 at the lower end of each drum is firmly fixed a pulley 70, operably connected by means of belt 72 to pulley 74, firmly attached to the shaft of motor 76. Either or both of said pulleys may be of the adjustable diameter type, in order to insure tightness of belt 72.

Motors 76 are mounted firmly on motor bases 78, said motor bases being rigidly attached to pivot rods 80. Said rods pivot freely in brackets 82, which are rigidly attached to housing 48. The lower ends of adjusting bolts 84, adjustably mounted adjacent the edge of motor base 78 opposite pivot rod 80, rest on top of housing 48. Adjustment of bolts 84 will pivot motor base 78 on pivot rod 80, thereby varying the distance between pulleys 70 and 74 and serving as a means for tightening belt 72. The use of independent driving means for each of picking drums 52 renders said drums independent of each other for the purpose of adjusting the angular relationship therebetween, as heretofore described.

An outer belt guard 86, an inner belt guard 88, both rigidly attached to lower end panels 46, and a motor cover 90 hingeably attached to housing 48 by means of hinges 92, serve to prevent wet feathers from fouling the driving gear. When closed, said motor cover is fastened to said outer belt guard by suitable fasteners 94.

The fowls 96 to be plucked are passed horizontally between the rotating drums in substantially the central vertical plane of the machine, being suspended from a suitable conveyor of standard type, comprising a stationary rail 98, a plurality of carriages 97 adapted to be moved along said rail by a moving conveyor chain 99, and brackets 100 pivotally suspended from said carriages by means of flexible connections 101 and pivots 103. Said brackets may be of any of several commercially available types consisting substantially of an inverted U-shaped frame having fixed between its legs a horizontal member 105 suitable for engaging the legs of a fowl.

As said bracket passes through the machine, it is engaged by and guided between two hollow guide rods 102. Said guide rods are disposed symmetrically about the center line of the machine in a horizontal plane, and have portions adjacent each end so shaped that the space between said guide rods tapers in the direction of travel of the bracket to a space less than the width of said U-shaped brackets, thus forcing said bracket to turn about pivot 103 to pass between said guide rods, and a central portion between said tapered end portions wherein said guide rods are sufficiently far apart as not to touch or restrict movement of said shackles in any way.

Hollow guide rods 102 have extensions projecting horizontally at right angles to the center line of the machine and passing slidably through sleeves 104 and maintained in fixed relationship with said sleeves by set screws 106. Said sleeves 104 are firmly fixed to T-connections 108, which are in turn rigidly fastened to vertical rods 110. Said rods pass slidably through sleeves 112, and may be maintained in fixed relationship therewith by means of set screws 114. Sleeves 112 are rigidly attached to housing 48.

Each hollow guide rod 102 has a hose 116 connected with its extended forward end, whereby water is introduced to said guide rods and passes through holes 107 in said guide rods, as in Figure 5. In the end or tapered portions of said guide rods, the water is directed vertically downwardly, and in the central portion of said guide rods the water is directed obliquely downwardly toward the center line of the machine. The water thus introduced serves to lubricate the resilient picking fingers and thereby to prevent injury to the fowl being plucked.

To prepare the machine for operation, automobile type jacks are placed under jack lugs 18, set screws 16 are loosened, and machine base 2 raised or lowered to a proper elevation to pick the particular size of fowl being processed, as shown in Figure 3. Set screws 16 are then tightened and the jacks removed. Picking drums 52 are then adjusted to the size of the fowl to be picked by loosening clamp bolts 26, applying a removable manually operable crank to the squared ends of screw 28. When the drums are properly spaced, clamp bolts 26 are tightened. This adjustment is such that the drums may be moved near enough together that the resilient fingers mounted on the periphery of one drum will touch the fingers mounted on the periphery of the other drum. In practice, however, it has usually been found advantageous to position the drums farther apart at the rear, or entrance, end of the machine than at the exit end. The flexibility of the adjustment of this machine permits such angular relationship of said drums.

Guide rods 102 are then vertically adjusted by loosening set screws 114 and sliding rods 110 in sleeves 112 to a horizontal position substantially at a common level with the mid-point of fowl supporting brackets 100, and horizontally adjusted by loosening set screws 106 and sliding guide rods 102 in sleeves 104 to positions symmetrically disposed about the center line of the machine and spaced apart sufficiently to pivot bracket 100 about pivot 103 as far as desired, as heretofore described. The rotation usually desired is approximately one-quarter turn. The machine is then properly adjusted and is prepared for operation by switching on motors 76 and supplying water to guide rods 102 through hoses 116.

The fowl to be picked are carried through the machine from rear to front, being suspended from conveyor rail 98 by means of brackets 100. As a fowl is engaged by the resilient picking fingers 60, it is rotated by the action of said fingers to a position with its legs in a plane at right angles to the center line of the machine, since the body of a fowl is much thicker from breast to back than from side to side. At this time feathers are removed principally from the neck and wings. When bracket 100, supporting the fowl, is advanced to a point where it is engaged by guide rods 102, said guide rods turn said bracket, and the fowl, gradually through substantially a one-quarter turn about pivot 103. At the same time, due to the tilt of picking drums 52, the center of the picking area moves higher with respect to the fowl. During said quarter turn, feathers are removed principally from the breast and upper back. When bracket 100 reaches the central portion of guide rods 102, said guide rods no longer restrict said brackets, and the bracket is again pivoted to a position at right angles to the center line of the machine by the action of fingers 60 on the body of the fowl. While the fowl is within this central portion of said guide rods, feathers are removed principally from the sides and outer surfaces of the thighs of the fowl. When bracket 100 reaches the forward tapered space between guide rods 102, it again is engaged by said guide rods and pivoted gradually through substantially a one-quarter turn about a vertical axis, during which time feathers are removed principally from the lower back, the inner surfaces of the thighs, and the area between the legs of the fowl.

Picking of the fowl is then complete and it is moved on conveyor rail 98 to the next operation.

The improvements I claim as my invention and which I desire to be covered by Letters Patent are:

1. A poultry picking machine comprising a vertically adjustable base, two upright frames carried by said base, a drum carried by each of said frames and adapted to rotate, means for rotating said drums in opposite directions, a plurality of resilient picking fingers carried pivotally on the peripheries of said drums, a suitable conveyor system for passing the fowls to be picked between said picking drums, and means including guides carried rigidly by said frames and cooperating with the fowl supporting means to oscillate each of said fowls about a vertical axis.

2. A poultry picking machine comprising a vertically adjustable base, two upright frames carried by said base, a drum carried by each of said frames and adapted to rotate, means for rotating said drums in opposite directions, a plurality of resilient picking fingers carried on the peripheries of said drums, a suitable conveyor system for passing the fowls to be picked between said picking drums, and means for successively presenting all parts of the fowl body to the action of said picking fingers comprising in combination a U-shaped bracket by means of which each bird is suspended from said conveyor and a pair of guide rods carried by the frames supporting the picking drums which engage and guide said bracket as it passes between said drums, causing said bracket to turn about a vertical axis, thereby turning the fowl supported by said bracket with respect to said picking drums.

3. A poultry picking machine having a base vertically adjustable on legs extending through sleeves rigidly attached to said base, two upright drum supporting frames carried independently on said base, means for adjusting said frames on said base in such a manner that the distance and angular relationship between said frames may be varied, a substantially cylindrical drum carried by each of said frames and adapted to rotate, said drums having axes tilted at a fixed angle to the horizontal, a plurality of resilient fingers individually pivoted on said drums about axes parallel to the axes of said drums, said fingers being placed in offset relationship on said drums, independent means for rotating said drums in opposite directions, suitable conveyor means for passing the fowl to be plucked between said drums, and means carried by said drum supporting frames for automatically positioning said fowl so that all parts of the body of the fowl are successively presented to the picking action of said resilient fingers.

4. In a poultry picking machine, in combination with a base of a pair of spaced supporting frames on the base; an elongated feather-picking assembly carried by each of said frames respectively, said assemblies being rotatable on their longitudinal axes; means shiftably mounting at least one of said frames on the base for movement toward and away from the other of said frames; a pair of spaced, independently extensible devices, each joining the base and said one frame for shifting the latter relatively to the base whereby to vary the distance between said assemblies and the angularity between said longitudinal axes thereof; and a plurality of supporting legs for said base, said legs being extensible for raising and lowering the base, the frames and the assemblies as a unit.

5. In a poultry picking machine, in combination with a base of a pair of spaced supporting frames on the base; an elongated feather-picking assembly carried by each of said frames respectively, said assemblies being rotatable on their longitudinal axes; means for each frame respectively for mounting the frames on the base for movement toward and away from each other; a pair of spaced, independently extensible devices for each frame respectively, each device joining the base and its frame for shifting the latter relative to the base, whereby to vary the distance between said assemblies and the angularity between said longitudinal axes thereof; and a plurality of supporting legs for said base, said legs being extensible for raising and lowering the base, the frames and the assemblies as a unit, separate from the operation of said devices.

6. In poultry handling apparatus; a horizontal conveyor track; a carrier on the track; an elongated shackle depending from the carrier and rotatable on a vertical axis relative to the carrier; and shackle-turning means within the path of travel of the shackle including a pair of spaced, horizontal rods underlying the track, said rods diverging as one end thereof is approached for receiving the shackle as the same is advanced along the track, the distance between the rods at the opposite ends thereof being less than the length of shackle and greater than the width thereof.

GORDON W. JOHNSON.

REFERENCES CITED

The following references are of record in the file of this patent:

UNITED STATES PATENTS

| Number | Name | Date |
| --- | --- | --- |
| 994,523 | Kohlhepp | June 6, 1911 |
| 1,217,393 | Berg | Feb. 27, 1917 |
| 1,230,819 | Gall | June 19, 1917 |
| 1,694,018 | Mudge et al. | Dec. 4, 1928 |
| 1,755,665 | Richards | Apr. 22, 1930 |
| 1,817,332 | Worrall | Aug. 4, 1931 |
| 1,897,971 | Johnston | Feb. 14, 1933 |
| 2,328,770 | Barker | Sept. 7, 1943 |
| 2,410,330 | Ashenfelter | Oct. 29, 1946 |
| 2,422,608 | Albright | June 17, 1947 |
| 2,423,560 | Jasper | July 8, 1947 |
| 2,484,235 | Mead | Oct. 11, 1949 |